US011688967B2

(12) United States Patent
Demcko et al.

(10) Patent No.: US 11,688,967 B2
(45) Date of Patent: Jun. 27, 2023

(54) WIRE TERMINATION DEVICE FOR COUPLING A WIRE TO A FEEDTHROUGH DEVICE AND SYSTEM INCLUDING THE SAME

(71) Applicant: AVX Corporation, Fountain Inn, SC (US)

(72) Inventors: Ronald Stephan Demcko, Raleigh, NC (US); Daniel West, Greenville, SC (US); Rhazy Edily, Sun Valley, CA (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 145 days.

(21) Appl. No.: 16/952,440

(22) Filed: Nov. 19, 2020

(65) Prior Publication Data

US 2021/0159626 A1    May 27, 2021

Related U.S. Application Data (60) Provisional application No. 62/938,355, filed on Nov. 21, 2019.

(51) Int. Cl.
*H01R 13/52* (2006.01)
*H01R 13/20* (2006.01)
(Continued)

(52) U.S. Cl.
CPC .............. *H01R 13/20* (2013.01); *H01R 13/04* (2013.01); *H01R 13/111* (2013.01);
(Continued)

(58) Field of Classification Search
CPC ...... H01R 13/20; H01R 13/04; H01R 13/111; H01R 13/5219; H01R 13/641;
(Continued)

(56) References Cited

U.S. PATENT DOCUMENTS 3,612,801 A * 10/1971 Elliott .................. H01H 1/5866
200/302.3
5,547,395 A    8/1996 Delamotte
(Continued)

FOREIGN PATENT DOCUMENTS

EP    3 544 132 A1    9/2019
KR    20160091131 A    8/2016

OTHER PUBLICATIONS

International Search Report and Written Opinion for PCT/US2020/061290 dated Mar. 11, 2021, 9 pages.

*Primary Examiner* — Abdullah A Riyami
*Assistant Examiner* — Nelson R. Burgos-Guntin
(74) *Attorney, Agent, or Firm* — Dority & Manning, P.A (57) ABSTRACT

A wire termination device for coupling a wire to a feedthrough device is disclosed. The wire termination device can include a housing having a first end and a second end spaced apart from the first end in a longitudinal direction. The housing can define a cavity and an opening to the cavity at the first end for receiving a pin of the feedthrough device. The pin of the feedthrough device can extend in the longitudinal direction. The wire termination device can include a retention member coupled to the housing and located at least partially within the opening of the housing. The retention member can be configured to engage the pin of the feedthrough device to retain the pin of the feedthrough device in the opening of the housing.

20 Claims, 9 Drawing Sheets

(51) Int. Cl.
  *H01R 13/6581* (2011.01)
  *H01R 13/04* (2006.01)
  *H01R 13/641* (2006.01)
  *H01R 13/11* (2006.01)
  *H02G 3/22* (2006.01)

(52) U.S. Cl.
  CPC ....... *H01R 13/5219* (2013.01); *H01R 13/641* (2013.01); *H01R 13/6581* (2013.01); *H02G 3/22* (2013.01)

(58) Field of Classification Search
  CPC .. H01R 13/6581; H01R 11/11; H01R 13/746; H02G 3/22
  See application file for complete search history.

(56) References Cited

U.S. PATENT DOCUMENTS

| | | | |
|---|---|---|---|
| 7,794,256 B1 | 9/2010 | Sochor | |
| 7,952,035 B2 | 5/2011 | Falk et al. | |
| 8,226,303 B2* | 7/2012 | Toth | G02B 6/389 |
| | | | 385/53 |
| 8,287,295 B2 | 10/2012 | Sivik et al. | |
| 8,968,018 B2 | 3/2015 | Sivik et al. | |
| 9,065,224 B2 | 6/2015 | Marzano et al. | |
| 9,478,965 B2 | 10/2016 | Chalmers et al. | |
| 9,733,436 B2* | 8/2017 | Van Baelen | G02B 6/387 |
| 9,772,453 B2* | 9/2017 | Zhu | G02B 6/3825 |
| 9,780,482 B2* | 10/2017 | Lewin | H01R 13/5219 |
| 10,365,078 B2 | 7/2019 | Eitschberger | |
| 10,680,423 B2* | 6/2020 | Ehmann | H01B 17/303 |
| 11,322,882 B2* | 5/2022 | Tobias | H01R 13/5219 |
| 11,385,416 B2* | 7/2022 | Takano | G02B 6/3888 |
| 2005/0037656 A1* | 2/2005 | Cairns | G02B 6/3816 |
| | | | 439/353 |
| 2005/0087357 A1 | 4/2005 | Steinich | |
| 2007/0066116 A1 | 3/2007 | Steinich | |
| 2007/0119611 A1 | 5/2007 | Steinich | |
| 2008/0003868 A1* | 1/2008 | Cairns | H01R 13/5219 |
| | | | 439/552 |
| 2008/0067294 A1 | 3/2008 | Heller et al. | |
| 2011/0207340 A1* | 8/2011 | Cairns | H01R 35/04 |
| | | | 439/13 |
| 2015/0237771 A1* | 8/2015 | Natter | H05K 9/0098 |
| | | | 174/77 R |
| 2016/0276775 A1* | 9/2016 | Nicholson | H01R 13/17 |
| 2019/0219770 A1* | 7/2019 | Cairns | H01R 13/523 |
| 2021/0041641 A1* | 2/2021 | Hu | G02B 6/3817 |
| 2021/0095529 A1* | 4/2021 | Gissler | E21B 17/003 |
| 2021/0098151 A1* | 4/2021 | Gissler | E21B 17/003 |
| 2021/0159626 A1* | 5/2021 | Demcko | H01R 13/20 |
| 2021/0273373 A1* | 9/2021 | Ramasubramanian | H01R 13/521 |

\* cited by examiner

502
COUPLING A WIRE TO A WIRE TERMINATION DEVICE AT A SECOND END OF A HOUSING OF THE WIRE TERMINATION DEVICE, THE NOUSING HAVING A FIRST END SPACED APART FROM THE SECOND END IN A LONGITUDINAL DIRECTION AND HAVING A CAVITY OPEN AT SECOND END OF THE HOUSING

504
INSERTING A PIN OF A FEEDTHROUGH DEVICE INTO THE CAVITY OF THE WIRE TERMINATION DEVICE UNTIL A RETENTION MEMBER OF THE WIRE TERMINATION DEVICE ENGAGES THE PIN OF THE FEEDTHROUGH DEVICE AND RETAINS THE PIN OF THE FEEDTHROUGH DEVICE IN THE OPENING OF THE HOUSING

WIRE TERMINATION DEVICE FOR COUPLING A WIRE TO A FEEDTHROUGH DEVICE AND SYSTEM INCLUDING THE SAME

CROSS REFERENCE TO RELATED APPLICATION

The present application claims filing benefit of U.S. Provisional Patent Application Ser. No. 62/938,355 having a filing date of Nov. 21, 2019, which is incorporated herein by reference in its entirety.

BACKGROUND OF THE INVENTION

Electrical transients such as current surges and voltage spikes can damage electrical devices and systems. In many applications, electrical devices are interconnected via wiring that passes through a structure. For example, vehicles such as planes and helicopters, wiring often passes through structural components, such as ribs or bulkheads, to connect various devices. To protect electrical devices from electrical transients passing through such wiring, feedthrough devices may be used to facilitate interconnection of the various components. Feedthrough devices may be configured to divert electrical transients to ground, such as the structural component to which the device is mounted.

Coupling wires to such feedthrough devices, however, can be laborious. Further, soldering wires to feedthrough devices can heat the feedthrough device causing thermal stress fatigue and/or stress concentrations. Such stress fatigue and/or stress concentrations can lead to failure of the feedthrough devices.

SUMMARY OF THE INVENTION

In accordance with one embodiment of the present disclosure, a wire termination device for coupling a wire to a feedthrough device can include a housing having a first end and a second end spaced apart from the first end in a longitudinal direction. The housing can define a cavity and an opening to the cavity at the first end for receiving a pin of the feedthrough device. The pin of the feedthrough device can extend in the longitudinal direction. The wire termination device can include a retention member coupled to the housing and located at least partially within the opening of the housing. The retention member can be configured to engage the pin of the feedthrough device to retain the pin of the feedthrough device in the opening of the housing.

In accordance with another embodiment of the present disclosure, a wire termination system can include a feedthrough device including a pin. The wire termination system can include a wire termination device including a housing having a first end and a second end spaced apart from the first end in a longitudinal direction. The housing can be coupled to a wire at the first end of the housing. The housing can define a cavity and an opening to the cavity at the first end of the housing. The wire termination device can include a retention member coupled to the housing and located at least partially within the opening of the housing. The retention member can be engaged with the pin of the feedthrough device to retain the pin of the feedthrough device in the opening of the housing.

In accordance with another embodiment of the present disclosure, a method for connecting a wire with a feedthrough device can include coupling the wire to a wire termination device at a second end of a housing of the wire termination device. The housing can have a first end spaced apart from the second end in a longitudinal direction and have a cavity open at second end of the housing. The method can include, after coupling the wire to the wire termination device, inserting a pin of a feedthrough device into the cavity of the wire termination device until a retention member of the wire termination device engages the pin of the feedthrough device and retains the pin of the feedthrough device in the cavity of the housing.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures, in which.

Repeat use of reference characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present disclosure is directed to a wire termination device and system for coupling a wire to a feedthrough device and a method for connecting a wire termination device with a feedthrough device. The wire termination device can be physically and electrically coupled to a wire. For example, the wire can be soldered to the wire termination device before the wire termination device is connected with the feedthrough device. As such, soldering can be performed without heating the feedthrough device. Next, the wire termination device can be easily mechanically coupled to the feedthrough device using mechanical features of the wire termination device. For example, the wire termination device can include a retention mechanism configured to engage or latch to a pin of the feedthrough device. The wire termination device can be secured to the feedthrough device with the wire physically and electrically connected with the pin of the feedthrough device, thereby electrically connecting the wire of the wire termination device with the wire of the feedthrough device. The wire termination device can snap into place and/or produce an audible indication (e.g., clicking sound) to notify the user that the wire termination device is secured in place.

More specifically, in some embodiments, a wire can be coupled to the wire termination device, for example, at an end of a housing of the wire termination device. The wire can be soldered, welded, and/or mechanically coupled to the wire termination device. For instance, the housing can include a tab or other protrusion that can be plastically deformed (e.g., crimped, bent, etc.) to mechanically couple the wire to the wire termination device.

As noted above, the wire can be coupled (e.g., soldered) to the wire termination device before the wire termination device is coupled to the feedthrough device. For instance, wires can be coupled with respective wire termination devices in a bulk and/or automated process (e.g., at a manufacturing location). The wires can then easily and quickly be coupled with feedthrough devices using the wire termination devices (e.g., at an installation location).

The wire termination device can include a housing having a first end and a second end that is spaced apart from the first end in a longitudinal direction. The housing can define a cavity and an opening to the cavity at the first end for receiving a pin of the feedthrough device. The pin can extend in the longitudinal direction. The wire termination device can include a retention member, such a resilient spring or tine, coupled to the housing and located at least partially within the opening of the housing. Alternatively, the retention member can be rigid and coupled with a spring or tine to bias the retention member. The retention member can be configured to engage the pin of the feedthrough device to retain the pin of the feedthrough device in the opening of the housing.

The retention member can be coupled to an inside surface of the housing within the cavity of the housing. For example, the retention member can provide an electrical path between the pin of the feedthrough device and the housing of the wire termination device (and ultimately the wire of the wire termination device). In some embodiments, the retention member can include an elongated strip of resilient material having a first end and a second end. The first end of the elongated strip can be coupled to the inside surface of the housing and the second end of the elongated strip can be configured to engage the pin of the feedthrough device to retain the pin of the feedthrough device in the opening of the housing. For instance, the retention member can be positioned and sized such that when the pin is sufficiently inserted in the cavity a radial protrusion or a radial recess of the pin passes the retention member in the longitudinal direction and deflects the retention member in a radial direction. The second end of the elongated strip of the retention member can then engage the radial protrusion or radial recess of the pin. For example, the second end of the elongated strip can be lodged, trapped, or locked against the radial protrusion or received in the radial recess of the pin.

In some embodiments, the wire termination device can protect the electrical connection (e.g., between the pin and the retention member) against tampering and/or corrosion. For example, the pin of the feedthrough device can be received within a cavity of the wire termination device such that the pin of the feedthrough device is protected. More specifically, an opening of the cavity of the wire termination device can be sealed against the feedthrough device such that the cavity of the wire termination device is sealed against an ambient environment. For example, the retention member can be located within the cavity and configured to engage the pin of feedthrough device.

More specifically, the housing can have a first end surface at the first end. The retention member can be configured to bias the first end surface of the housing against the feedthrough device when the retention member is engaged with the pin of the feedthrough device. The retention member can be configured to apply tension to the pin such that the first end surface of the housing is forced against a sealing surface of a sealing member the feedthrough device to seal the opening such that the cavity is sealed from an ambient environment when the retention member is engaged with the pin of the feedthrough device. More specifically, the first end surface of the housing can form a seal with the sealing surface of the sealing member to seal the opening of the cavity.

The sealing member between the feedthrough device and wire termination device and/or hermetic seal (e.g., within the feedthrough device) can be or include a variety of suitable materials. For example, in some embodiments the sealing member may include a thermoplastic or thermoset resin. Examples of such resins include, for instance, epoxy resins, polyimide resins, melamine resins, urea-formaldehyde resins, polyurethane resins, phenolic resins, polyester resins, etc. Epoxy resins are also particularly suitable for use in the encapsulant layer. Examples of suitable epoxy resins include, for instance, glycidyl ether type epoxy resins, such as bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc.

If desired, curing agents may also be employed in the encapsulant layer to help promote curing. When employed, the curing agents typically constitute from about 0.1 to about 20 wt. % of the encapsulant layer. Exemplary curing agents include, for instance, amines, peroxides, anhydrides, phenol compounds, silanes, acid anhydride compounds and combinations thereof. Specific examples of suitable curing agents are dicyandiamide, 1-(2 cyanoethyl) 2-ethyl-4-methylimidazole, 1-benzyl 2-methylimidazole, ethyl cyano propyl imidazole, 2-methylimidazole, 2-phenylimidazole, 2-ethyl-4-methylimidazole, 2-undecylimidazole, 1-cyanoethyl-2-methylimidazole, 2,4-dicyano-6,2-methylimidazolyl-(1)-ethyl-s-triazine, and 2,4-dicyano-6,2-undecylimidazolyl-(1)-ethyl-s-triazine, imidazolium salts (such as 1-cyanoethyl-2-undecylimidazolium trimellitate, 2-methylimidazolium isocyanurate, 2-ethyl-4-methylimidazolium tetraphenylborate, and 2-ethyl-1,4-dimethylimidazolium tetraphenylborate, etc. Still other useful curing agents include phosphine compounds, such as tributylphosphine, triphenylphosphine, tris(dimethoxyphenyl)phosphine, tris(hydroxypropyl)phosphine, and tris(cyanoethyl)phsphine; phosphonium salts, such as tetraphenylphosphonium-tetraphenylborate, methyltributylphosphonium-tetraphenylborate, and methyltricyanoethylphosphonium tetraphenylborate); amines, such as 2,4,6-tris(dimethylaminomethyl) phenol, benzylmethylamine, tetramethylbutylguanidine, N-methylpiperazine, and 2-dimethylamino-1-pyrroline, ammonium salts, such as triethylammonium tetraphenylborate; diazabicyclo compounds, such as 1,5-diazabicyclo[5,4,0]-7-undecene, 1,5-diazabicyclo[4,3,0]-5-nonene, and 1,4-diazabicyclo[2,2,2]-octane, salts of diazabicyclo compounds such as tetraphenylborate, phenol salt, phenolnovolac salt, and 2-ethylhexanoic acid salt; and so forth.

Still other additives may also be employed, such as photoinitiators, viscosity modifiers, suspension aiding agents, pigments, stress reducing agents, non-conductive fillers, stabilizers, etc. Suitable photoinitiators may include, for instance, benzoin, benzoin methyl ether, benzoin ethyl ether, benzoin n-propyl ether, benzoin isobutyl ether, 2,2 dihydroxy-2-phenylacetophenone, 2,2-dimethoxy-2-phenylacetophenone 2,2-diethoxy-2-phenylacetophenone, 2,2-diethoxyacetophenone, benzophenone, 4,4-bisdialylaminobenzophenone, 4-dimethylaminobenzoic acid, alkyl 4-dimethylaminobenzoate, 2-ethylanthraquinone, xanthone, thioxanthone, 2-cholorothioxanthone, etc. Likewise, the non-conductive fillers may include inorganic oxide particles, such as silica, alumina, zirconia, magnesium oxide, iron oxide, copper oxide, zeolites, silicates, clays (e.g., smectite clay), etc., as well as composites (e.g., alumina-coated silica particles) and mixtures thereof. In certain embodiments, fillers that contain a silicon atom, such as silica and/or silicates, may be particularly suitable to enhance the ability of the barrier layer to bond to the encapsulant layer, such as through a silicon-oxygen bond. When employed, such fillers may, for instance, constitute from about 20 wt. % to about 95 wt. %, and in some embodiments, from about 50 wt. % to about 85 wt. % of the encapsulant layer.

In some embodiments, the wire termination device can provide electrical connection with a ground of the feedthrough device. For example, the feedthrough device can have an outer grounding housing. The feedthrough device can include an outer grounding housing that is configured to electrically connect with the outer grounding housing of the wire termination device when the wire termination device is coupled to the feedthrough device. The housing of the wire termination device can be received within the outer grounding housing. For example, the wire termination device can include an electrically insulating layer disposed between the housing and the outer grounding housing such that the housing is electrically isolated from the outer grounding housing. A grounding wire can be coupled with the outer grounding housing of the wire termination device. Thus, the outer grounding housing of the wire termination device can be electrically connected with the outer grounding housing of the feedthrough device to provide an electrical connection with the ground of the feedthrough device.

In some embodiments, multiple retention members can be configured to engage the pin of the feedthrough device. The retention members can be arranged symmetrically with respect to a length of the pin. This configuration can reduce stress and strain on the pin of the feedthrough device caused by radial forces between the retention members and the pin of the feedthrough device.

In some embodiments, the wire termination device can include an outer seal configured to protect the wire termination device and/or feedthrough device. The outer seal can be configured to cover a first end of the housing of the wire termination device and/or a portion of the feedthrough device to protect a location where a first end surface of the housing of the wire termination device contacts the feedthrough device. The outer seal can be coupled to the outer grounding housing (if present) and/or the housing of the wire termination device. It should be understood that the outer seal can be coupled to any suitable surface of the wire termination device. An outermost surface of the wire termination device at the first end of the of wire termination device may be particularly suitable.

The outer seal can be formed and/or coupled to the wire termination device using a variety of suitable methods. For example, the outer seal can be overmolded, adhered, or otherwise affixed to the outer grounding housing. The outer seal can include a flexible material, such as rubber or a suitable polymeric material. The outer seal can be stretched over the feedthrough device to fit the outer seal over the feedthrough device when the wire termination device is coupled to the feedthrough device. The outer seal can additionally provide evidence of tampering and/or resistance to tampering with the wire termination. For example, the outer seal can harden over time such that removing the outer seal from the feedthrough device damages the outer seal providing a visual indication of tampering with the wire termination system.

In some embodiments, the feedthrough device may include a filter such as a multilayer ceramic capacitor. The multilayer ceramic capacitor may include a dielectric material. For example, the dielectric material may include a ceramic, semiconductive, or insulating material, such as but not limited to barium titanate, calcium titanate, zinc oxide, alumina with low-fire glass, or other suitable ceramic or glass-bonded materials. Alternatively, the dielectric material may be an organic compound such as an epoxy (with or without ceramic mixed in, with or without fiberglass), popular as circuit board materials, or other plastics common as dielectrics. In these cases, the conductor is usually a copper foil which is chemically etched to provide the patterns. In still further embodiments, dielectric material may comprise a material having a relatively high dielectric constant (K), such as one of NPO (COG), X7R, X5R X7S, Z5U, Y5V and strontium titanate. The dielectric constant of the dielectric material may range from about 100 to about 25,000, in some embodiments from about 200 about 10,000, and in some embodiments, from about 500 to about 9,000, such as determined in accordance with ASTM D2149-13 at operating temperatures ranging from about −55° C. to about 150° C. (e.g., 25° C.) and frequencies ranging from about 100 Hz to about 1 GHz (e.g., 1 kHz).

The multilayer ceramic capacitor may also include a plurality of electrodes. The electrodes may be formed from a variety of suitable conductive materials. For example, the electrodes may be formed from different metals as is known in the art, such as precious metals (e.g., silver, gold, palladium, platinum, etc.), base metals (e.g., copper, tin, nickel, etc.), and so forth, as well as various combinations thereof. However, the electrodes may comprise any suitable conductive material.

In some embodiments, the filter of the feedthrough device may be or include a transient suppression device, such as a varistor or gas discharge tube. The transient suppression device may be configured to divert large current surges to the ground, for example, to the bulkhead or other supporting structure. As such the feedthrough device can prevent large transients (e.g., current surges) from passing through the feedthrough device and thus can protect elements (e.g., systems or sub-systems) connected to the feedthrough device.

I. Example Embodiments

Figure 1A:
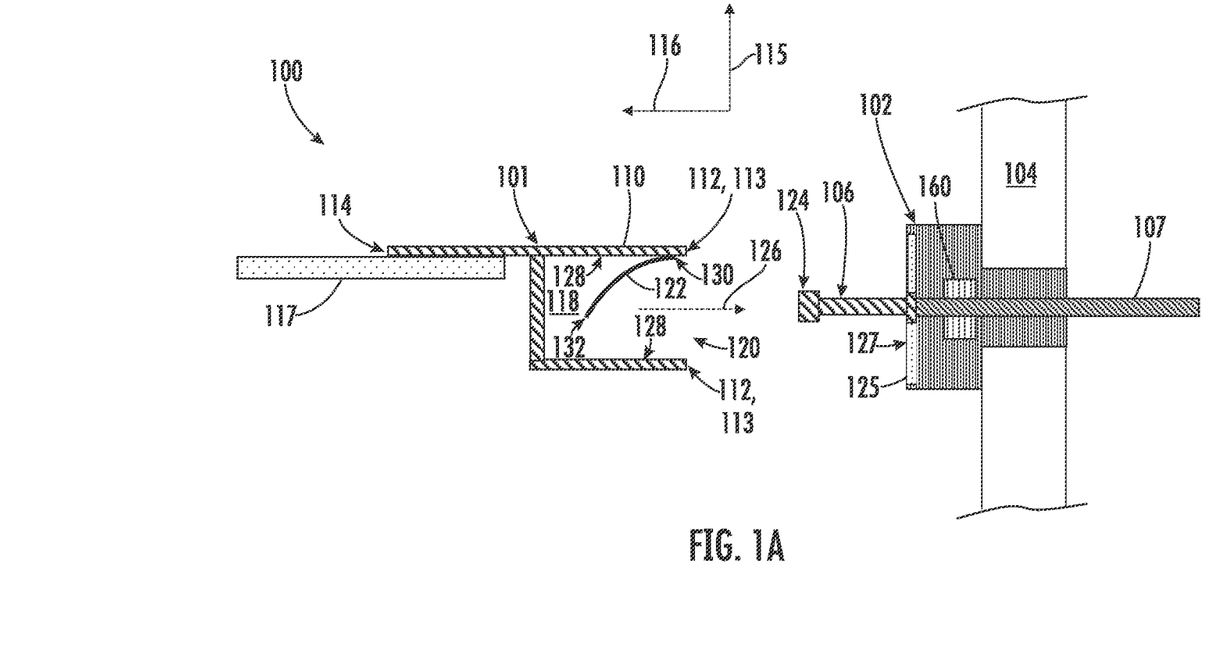
FIG. 1A illustrates one embodiment of a wire termination system including a wire termination device and a feedthrough in an unassembled state.
Figure 1B:
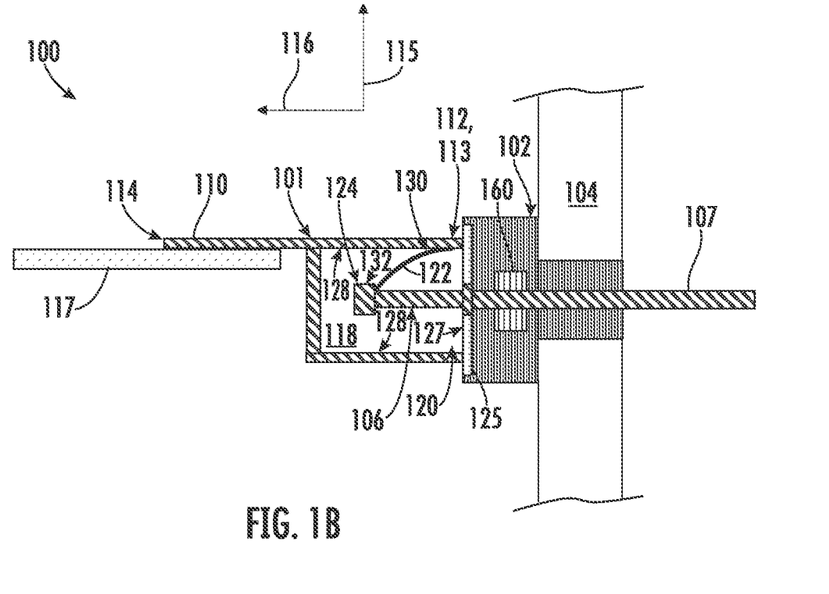
FIG. 1B illustrates the wire termination system of FIG. 1A in an assembled state.

FIGS. 1A and 1B illustrate side elevation views of a wire termination system 100. The wire termination system 100 can include a wire termination device 101 and a feedthrough device 102. FIG. 1A illustrate the wire termination system 100 in an unassembled state. FIG. 1B illustrates the wire termination system 100 in an assembled state.

Referring to FIG. 1A, a feedthrough device 102 can be received in a bulkhead 104 or other supporting structure. For example, the feedthrough device 102 can be configured to make a threaded connection with the bulkhead 104. However, the feedthrough device 102 can be coupled to the bulkhead 104 using any suitable technique, for example press-fitting, welding, adhesive, etc.

The feedthrough device 102 can include a pin 106. The feedthrough device 102 can include a wire 107 electrically connected with the pin 106 to provide an electrical connection through the bulkhead 104 or other structure.

A wire termination device 101 can include a housing 110 having a first end 112 and a second end 114 spaced apart from the first end 112 in a longitudinal direction 116. The housing 110 can be coupled to a wire 117 at the second end 114 of the housing 110. The housing 110 can define a cavity 118 and an opening 120 to the cavity 118 at the second end 112 of the housing 110.

The wire termination device 101 can include a retention member 122 coupled to the housing 110. The retention member 122 can be located at least partially within the cavity 118 of the housing 110. The retention member 118 can be configured to engage the pin 106 of the feedthrough device 102 to retain the pin 106 of the feedthrough device 102 in the cavity 118 of the housing 110 when the wire termination device 101 is coupled with the feedthrough device 102.

FIG. 1B shows the wire termination device 101 coupled to the feedthrough device 102. The retention member 122 can be engaged with the pin 106 of the feedthrough device 102 to retain the pin 106 of the feedthrough device 102 in the cavity 118. The retention member 122 can form an electrical connection between the pin 106 and the wire termination device 101 (e.g., the housing 110) and ultimately electrically connect the wire 107 of the feedthrough device 102 with the wire 117 of the wire termination device 110.

For example, the pin 106 can include a radial protrusion 124. As the wire termination device 101 is moved towards the feedthrough device 102 to insert the pin 106 into the cavity 118 of the housing 110 (as illustrated by arrow 126 in FIG. 1A), the radial protrusion 124 of the pin 106 can pass the retention member 122 in the longitudinal direction 116. The pin 106 can defect the retention member 122 in a radial direction 115. The retention member 122 can then engage the radial protrusion 124 of the pin 106 to retain the pin 106 in the cavity 118.

The retention member 122 can have a variety of configurations. The retention member 122 can be coupled to an inside surface 128 of the housing 110 of the wire termination device 101 and extend away from the first end 112 of the housing 110 within the cavity 118. The retention member 122 can include or be formed as an elongated strip of material having a first end 130 that is coupled to the inside surface 128 of the housing 110 and a second end 132 that is configured to engage with the radial protrusion 124 of the pin 106. The second end 132 of the elongated strip of the retention member 122 can be lodged, trapped, or locked against the radial protrusion 124 of the pin 106. In alternative embodiments, the pin 106 may include a radial recess or other suitable feature for the second end of the retention member 122 to engage.

The retention member 122 can be configured to bias the housing 110 against the feedthrough device 102 when the retention member 122 is engaged with the pin 106 of the feedthrough device 102. For example, the housing 110 can have a first end surface 113 at the first end 112. The retention member 122 can be configured to bias the first end surface 113 of the housing 110 against a sealing surface 124 (e.g., of a sealing member 125). The retention member 122 can apply a force in the longitudinal direction 116 against the radial protrusion 124 of the pin 106 and away from the feedthrough device 102. As a result, the pin 106 can be in tension and can force the sealing member 126 of the feedthrough device 102 against the first end surface 113 of the housing 110. In some embodiments, the sealing surface 127 can seal against the first end surface 113 of the housing 110 such that the cavity 118 is sealed from an ambient environment when the retention member 122 is engaged with the pin 106 of the feedthrough device 102.

In some embodiments, the feedthrough device 102 can include a filter 160 and/or transient suppression device. The filter can be or include a multilayer ceramic capacitor. The transient suppression device can be or include a varistor and/or gas discharge tube.

Figure 2:
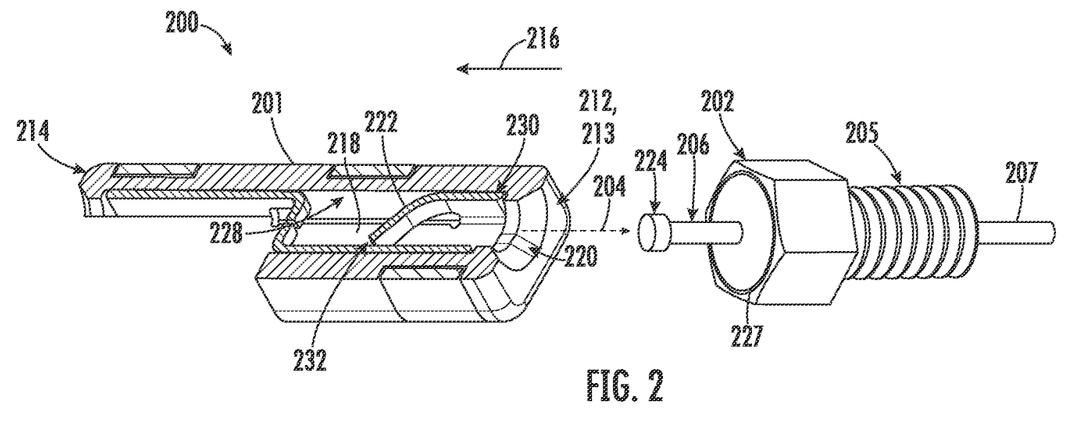
FIG. 2 is a perspective view of another embodiment of a wire termination system including a wire termination device and a feedthrough device according to aspects of the present disclosure.

FIG. 2 is a perspective view of a wire termination system 200 including a wire termination device 201 and a feedthrough device 202 according to aspects of the present disclosure. The wire termination device 201 can be configured to couple with feedthrough device 202, as illustrated by arrow 204. The feedthrough device 202 can be configured to couple to and/or be received in a bulkhead (e.g., as described with respect to the feedthrough device 202 and bulkhead 204 of FIG. 1B). For example, the feedthrough device 202 can include threads 205 for making a threaded connection with the bulkhead, which can include a tapped hole for receiving the threads 205.

The wire termination device 201 and/or feedthrough device 202 can be configured as described above with reference to FIGS. 1A through 2. The reference numbers of FIG. 2 (and subsequent figures) can correspond with those in FIGS. 1A and 1B.

Figure 3A:
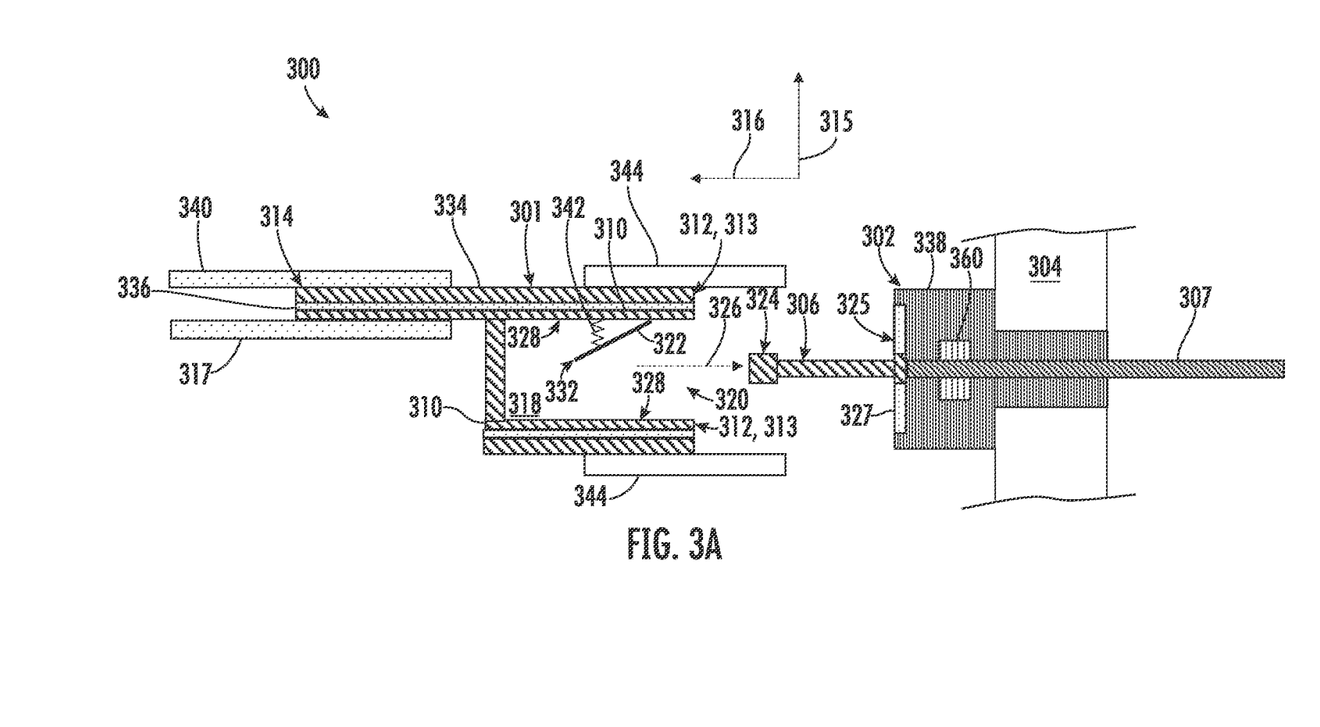
FIG. 3A illustrates an unassembled state of a wire termination system in which a wire termination device includes an electrically insulating layer according to aspects of the present disclosure.
Figure 3B:
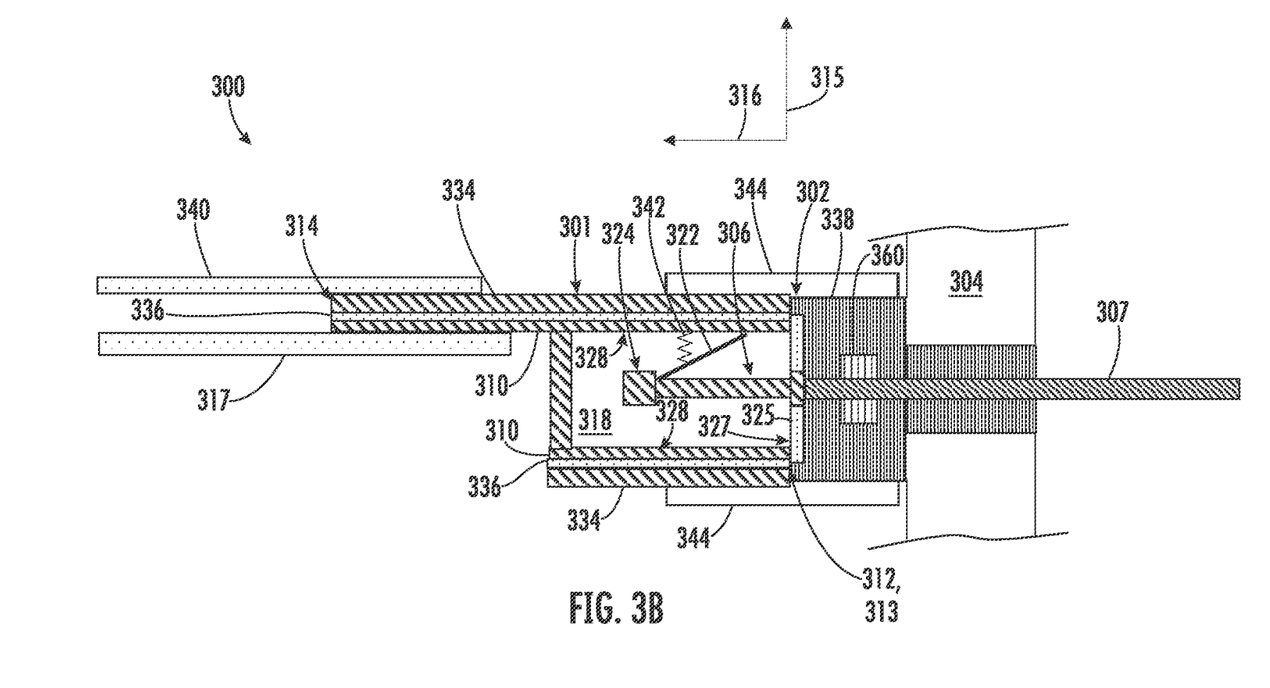
FIG. 3B illustrates an assembled state of the wire termination system of FIG. 3A.

FIGS. 3A and 3B illustrate side elevation views of another embodiment of a wire termination system 300 including a feedthrough device 302 and a wire termination device 301. The wire termination system 300 can be generally configured as the wire termination system 100 of FIGS. 1A and 1B and/or the wire termination system 200 of FIG. 2. However, the wire termination device 302 can additionally include an outer grounding housing 334 and an electrically insulating layer 336. The housing 310 can be received within the outer grounding housing 334. The electrically insulating layer 336 can be disposed between the housing 310 and the outer grounding housing 334 such that the housing 310 is electrically isolated from the outer grounding housing 334.

Referring to FIG. 3B, the outer grounding housing 334 can be electrically connected with an outer portion 338 of the feedthrough device 302. The outer portion 338 can be electrically isolated from the pin 306 and wire 307 of the feedthrough device 302 such that the outer grounding housing 334 is electrically connected to the bulkhead 304 or another grounding structure. A ground wire 340 can be coupled with the outer grounding housing 334 to provide an electrical grounding connection. The housing 310 can be electrically isolated from the outer portion 338 of the feedthrough device 302 (e.g., by the sealing member 327).

Referring to FIG. 3A, the retention member 322 can be rigid. The retention member 322 can be pivotally coupled with the inside surface 328 of the housing 310. A spring 342 can be coupled between the retention member 322 and the housing 310 and configured to bias the retention member 322 away from the inside surface 328 of the housing 310.

In some embodiments, the wire termination device 301 can include an outer seal 344 configured to cover a first end 312 of the housing 310 of the wire termination device 301. Referring to FIG. 3B, the outer seal 344 can be fitted over the feedthrough device 302 to protect a location where a first end surface 313 of the housing 310 contact the feedthrough device 302. Referring to FIG. 3A, the outer seal 344 can be coupled to the outer grounding housing 334 (if present). It should be understood that the outer seal 344 can be coupled to the housing 310 (e.g., housing 210 of FIG. 2) if the housing 310 is suitably located (e.g., as an outermost surface of the wire termination device 301 at the first end 312 of the of wire termination device 301).

The outer seal 344 can be formed and/or coupled to the wire termination device 301 using a variety of suitable methods. For example, the outer seal 344 can be over-molded, adhered, or otherwise affixed to the outer grounding housing 334. The outer seal 344 can include a flexible material, such as rubber or a suitable polymeric material. The outer seal 344 can be stretched over the feedthrough device 302 to fit the outer seal 344 over the feedthrough device 302, for example as shown in FIG. 3B. The outer seal 344 can provide additional protection against the ambient environment. Further, the outer seal 344 can provide evidence of tampering and/or resistance to tampering with the wire termination system 300. Although described with reference to the wire termination system 300 of FIGS. 3A and 3B, it should be understood that the outer seal 344 can be provided in combination with the wire termination systems 200, 400 of FIGS. 2 and/or 4.

Figure 4:
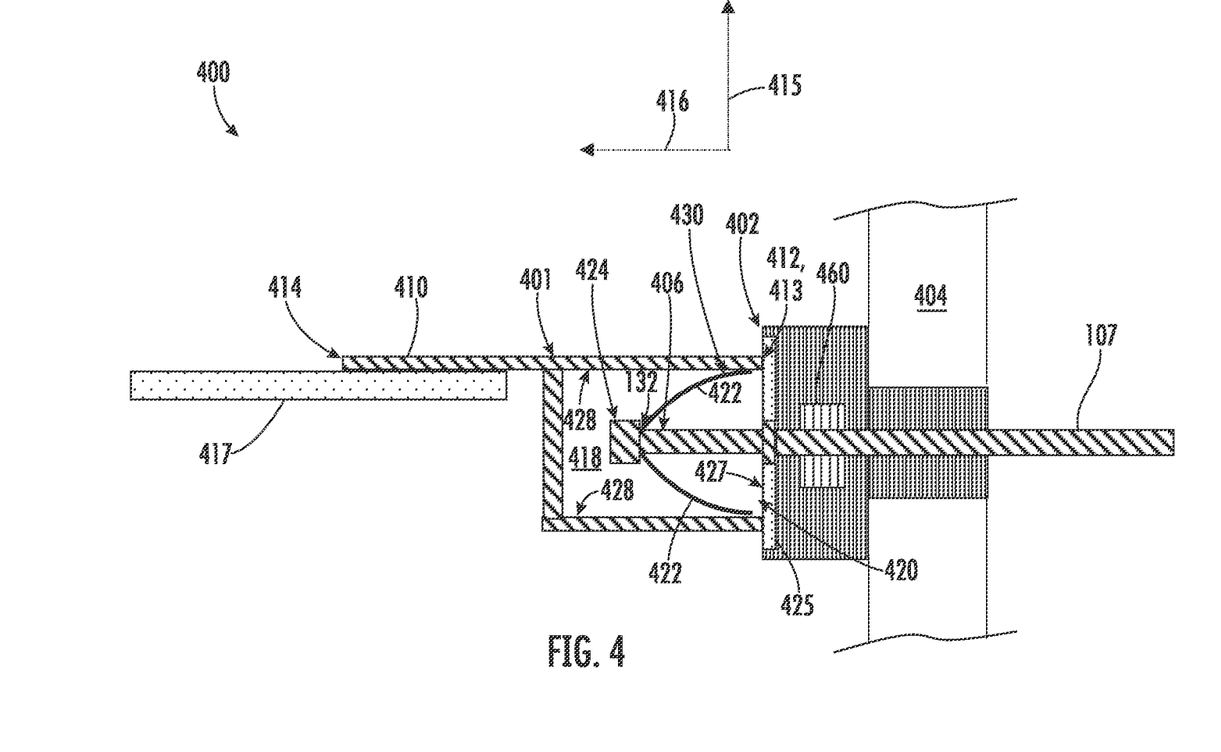
FIG. 4 illustrates an assembled state of another embodiment of a wire termination system in which multiple retention members are provided according to aspects of the present disclosure.

FIG. 4 illustrates another embodiment of a wire termination system 400 including a feedthrough device 401 and a wire termination device 402. The wire termination system 400 can include multiple retention members 422 that are configured to engage the pin 406 of the feedthrough device 402. The retention members 422 can be arranged symmetrically with respect to a length direction of the pin 406 (e.g., aligned with a longitudinal direction 416). This configuration can reduce stress and strain on the pin 406 of the feedthrough device 402. More specifically, the multiple retention members 422 can be arranged such that radial forces applied against the pin 406 are approximately equal, thus reducing bending stress and strain caused by the multiple retention members 422.

Figure 5:
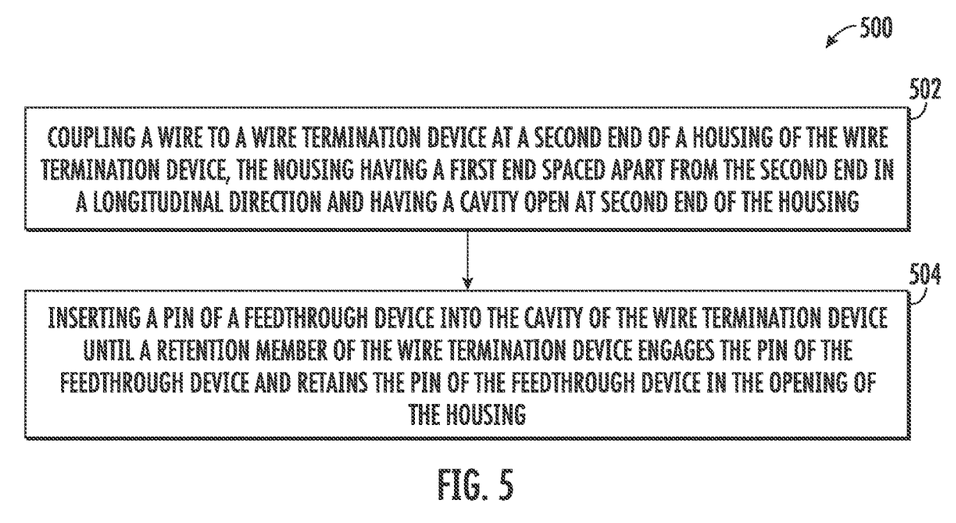
FIG. 5 illustrates a flowchart of an example method for connecting a wire with a feedthrough device according to aspects of the present disclosure.

Referring to FIG. 5, aspects of the present disclosure are directed to a method 500 for connecting a wire with a feedthrough device. In general, the method 500 will be described herein with reference to the wire termination systems 100, 200, 300, 400 described above with reference to FIGS. 1-4. However, it should be appreciated that the disclosed method 500 may be implemented with any wire termination system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring to FIG. 5, the method 500 may include, at (502), coupling a wire 117 to a wire termination device 101 at a second end 114 of a housing 110 of the wire termination device 101. The housing 110 can have a first end 112 spaced apart from the second end 112 in a longitudinal direction 116 and having a cavity 118 open at the second end 112 of the housing 110.

More specifically, in some embodiments, the wire 117 can be soldered to the wire termination device 101. Alternatively, the wire 117 can be welded, and/or mechanically coupled to the wire termination device 101. For instance, the housing 110 can include a tab or other protrusion that can be plastically deformed (e.g., crimped, bent, etc.) to mechanically couple the wire 117 to the wire termination device 101.

The method 500 may include, at (504), inserting a pin 106 of a feedthrough device 102 into the cavity 118 of the wire termination device 101 until a retention member 122 of the wire termination device 101 engages the pin 106 of the feedthrough device 102 and retains the pin 106 of the feedthrough device 102 in the cavity 118 of the housing 110. For example, the retention member 112 can engage the radial protrusion 124 of the pin 106.

The pin 106 of the feedthrough device 102 can be inserted the into the cavity 118 of the wire termination device 101 until at least one of the retention member 122 or pin 106 produces an audible sound, such as a click.

In some embodiments, the wire 117 can be coupled to the wire termination device 101 before the wire termination device 101 is coupled to the feedthrough device 102. For instance, multiple wires 117 can be coupled with respective wire termination devices 101 in a bulk and/or automated process. The wires 117 can then easily and quickly be coupled with respective feedthrough devices 102.

Figure 6:
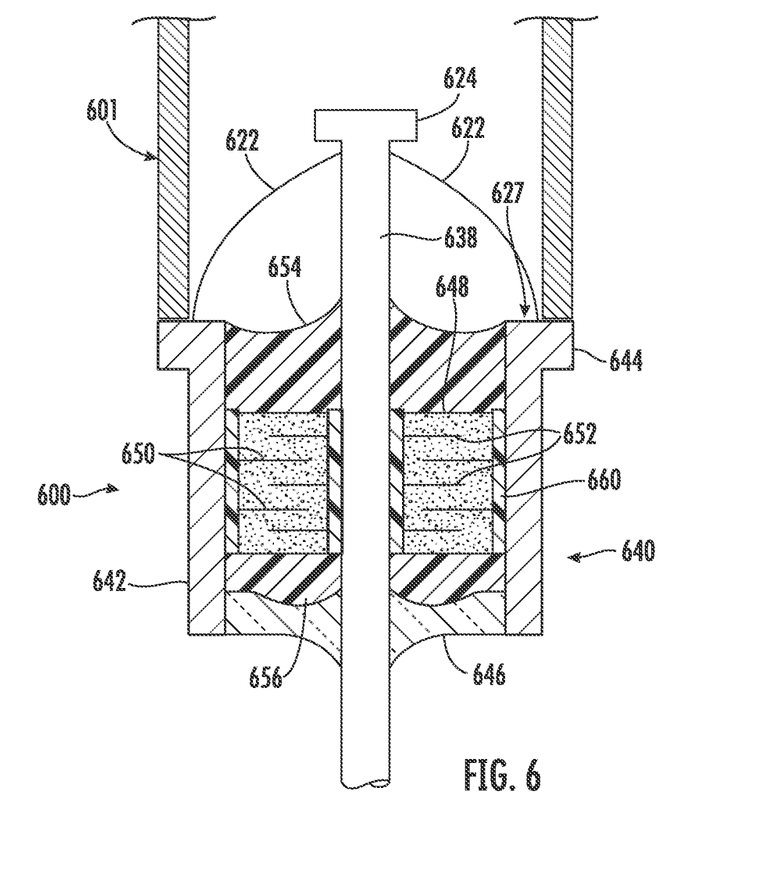
FIG. 6 illustrates an example feed-through device coupled with a wire termination device according to aspects of the present disclosure.

FIG. 6 illustrates an example feed-through device 600 coupled with a wire termination device 601 according to aspects of the present disclosure. The feed-through device can include a pin 638. The pin 638 can include a radial protrusion 624, for engaging one or more retention members 622 of the wire termination device 601, for example as described above with reference to FIGS. 1-5.

Various elements of the feed-through device 600 can be retained and supported by a housing 640. The housing 640 can have a main canister portion 642 and a weld flange 644. The housing 640 can include a sealing surface 627. A nonconductive disc 646 can maintain the pin 638 in electrically insulated and hermetically sealed relation with respect to housing 640.

A discoidal filter structure 648 can be located inside of the main canister portion 642. In some embodiments, the filter structure 648 can be a multilayer varistor structure having a plurality of first polarity electrodes 650 and a plurality of second polarity electrodes 652. The first polarity electrodes 650 can be connected with a first terminal 660. The first terminal 660 can be connected with the main canister portion 642. The second polarity electrodes 652 can be connected with a second terminal 658. The second terminal 658 can be connected with the pin 638.

The discoidal filter structure 648 can be potted between layers 654 and 656 of a suitable electrically insulating material. For example, the layers 654 and 656 can be or include a polymeric material, such as a nonconductive epoxy. A conductive epoxy may be applied at the respective terminals 658. 660 to facilitate electrical connections with the pin 638 and the main canister portion 642.

Figure 7:
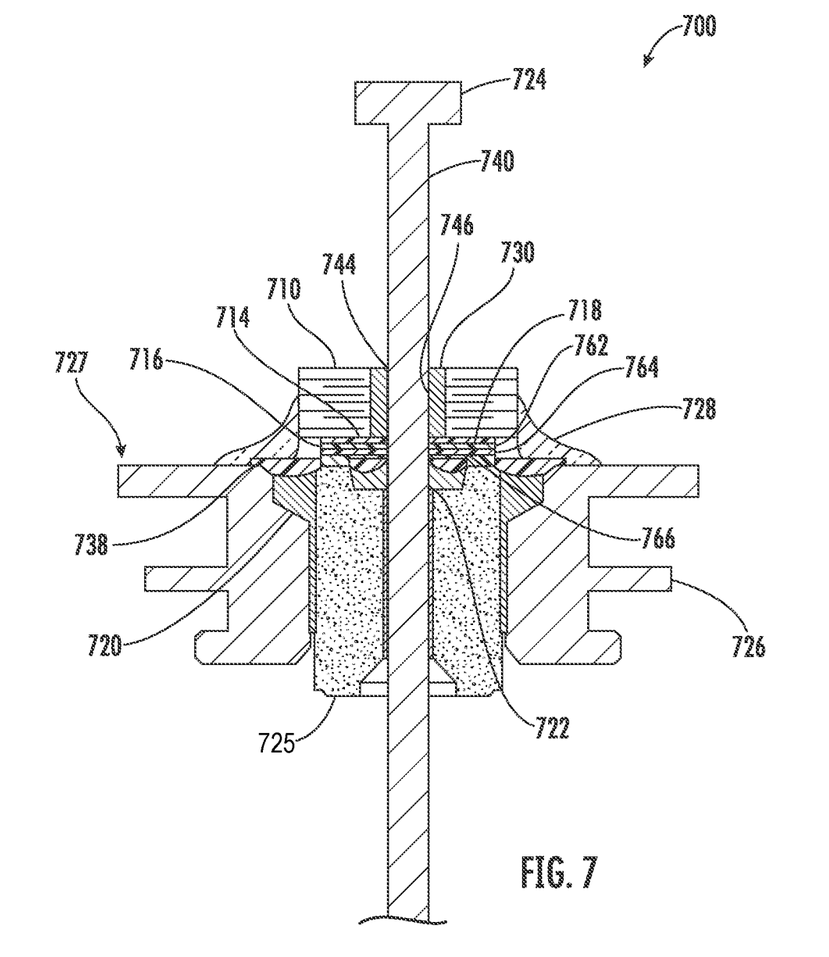
FIG. 7 illustrates another example feed-through device according to aspects of the present disclosure.

FIG. 7 illustrates another example feed-through device 700 according to aspects of the present disclosure. The feed-through device 700 can include a discoidal capacitor 710, a pin 740, an insulator 725, and a feedthrough housing 726. The pin 740 can include a radial protrusion 724, for engaging one or more retention members of a wire termination device, for example as described above with reference to FIGS. 1-5.

The capacitor 710 can include a passageway 744 through which the pin 740 extends. The inner diameter cylindrical surface 746 of the passageway 744 of the capacitor 710 can include a conductive material 730 for conductively coupling the capacitor 710 to the pin 740. In addition, the capacitor 710 may be conductively coupled to the feedthrough housing 726 via a conductive joint 728. In addition, an insulative layer is positioned between the capacitor 710 and the insulator 725. A washer 714 surrounding the pin 740 may also be positioned between the insulative layer 716 and the capacitor 710.

The feed-through device 700 can include a hermetic seal formed using any method known in the art. For instance, the hermetic seal may include a hermetically sealing material 720 between the insulator 725 and the feedthrough housing 726. The hermetic seal may also include a hermetically sealing material 722 between the insulator 725 and the pins 740.

In some embodiments, the EMI feed-through device 700 can include one or more coatings 738, 718, 736 (e.g., of resin) over the hermetically sealing material 720, 722, 732, respectively. For instance, a first resin coating 738 may be present over the hermetically sealing material 720 between the insulator 725 and the feedthrough housing 726. In such instance, the first resin coating 738 may not be covered by any other material or sandwiched. A second resin coating 718 may be present over the hermetically sealing material 722 between the insulator 725 and the pin 740. In such instance, the second resin coating 718 may not be covered by another material. For instance, the second resin coating 718 may be covered by the insulative layer 716.

II. Applications

The wire termination device and/or system may be used to more quickly, effectively, and/or securely attach a wire with a feedthrough device. The wire termination device and/or system may be particularly useful in applications that benefit from increased security such as tamper-resistant or tamper-evident connections. As noted, above, the wire termination device and/or system can be tamper-resistant. Once the wire termination device is coupled to the feedthrough device, the wire termination device can be difficult to de-couple form the feedthrough device without destroying the wire termination device. Further the outer seal can be difficult to remove without altering or destroying the outer seal. As such, tampering with the wire termination device can be visually evident. Thus, the wire termination device can prevent or discourage tampering and provide increased security.

The wire termination system can be used to protect any system or sub-system from electrical transients. For example, the wire termination system can be used to route electrical connections through vehicle structures (e.g., bulkheads). Example vehicles include air vehicles (e.g., airplanes, helicopters, etc.), land vehicles (e.g., trucks, tanks, etc.), and water vehicles (e.g., ships, sub-marines, amphibious vehicles, etc.). In some implementations, the feedthrough device can be used to preserve Faraday properties of a structure contained within or partially within an outer structure of the vehicle. For example, the wire termination system may be mounted to a bulkhead or other structural component such that an electrical signal or power supply may be connected or supplied through the feedthrough device (e.g., from one compartment to another compartment and/or into a system or sub-system of the vehicle). For instance, the wire termination system may be used to provide electrical connection between two systems or sub-systems of a vehicle (e.g., a radio system, navigation system, control system, and/or any sub-system thereof). Thus, the wire termination device and/or system can find application in a variety of vehicle systems.

The wire termination device and/or system may also find application with medical devices, including implantable devices. For example, cardiac pacemakers, defibrillators, and the like may be implanted into a patient and configured to deliver a therapeutic shock treatment to the heart of the patient. Such devices generally employ one or more power sources, such as a battery or capacitor. The power source is contained within a housing of the device, and one or more electrodes are disposed near the heart of the patient for delivering the therapeutic shock treatment to the heart. Such devices may include a feedthrough device according to aspects of the present disclosure to couple the electrode(s) with the power source. The presently disclosed feedthrough device may be useful for protecting the internal circuitry of the implantable devices from electrical transients (e.g., interference, current surges, etc.) that may be induced in the electrodes or associated leads of the device.

It should be understood that the wire termination systems, devices, and methods described herein can be used in in any suitable application in which electrical connections are needed through structures.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wire termination device for coupling a wire to a feedthrough device, the wire termination device comprising:
   a housing having a first end and a second end spaced apart from the first end in a longitudinal direction, the housing defining a cavity and an opening to the cavity at the first end for receiving a pin of the feedthrough device extending in the longitudinal direction; and
   a retention member coupled to an inside surface of the housing such that the retention member extends from the inside surface into the cavity of the housing, the retention member configured to engage the pin of the feedthrough device to retain the pin of the feedthrough device in the cavity of the housing.

2. The wire termination device of claim 1, wherein the retention member comprises an elongated strip of material having a first end and a second end, and wherein the first end of the elongated strip is coupled to the inside surface of the housing and the second end of the elongated strip is configured to engage the pin of the feedthrough device to retain the pin of the feedthrough device in the cavity of the housing.

3. The wire termination device of claim 1, wherein the housing has a first end surface at the first end, and the retention member is configured to bias the first end surface of the housing against the feedthrough device when the retention member is engaged with the pin of the feedthrough device.

4. The wire termination device of claim 3, wherein the retention member is configured to bias the first end surface of the housing against a sealing surface of the feedthrough device to seal the opening such that the cavity is sealed from an ambient environment when the retention member is engaged with the pin of the feedthrough device.

5. The wire termination device of claim 1, wherein the retention member is configured to engage at least one of a radial protrusion or a radial recess of the pin of the feedthrough device.

6. The wire termination device of claim 1, further comprising an outer grounding housing and an electrically insulating layer, wherein the housing is received within the outer grounding housing, and wherein the electrically insulating layer is disposed between the housing and the outer grounding housing such that the housing is electrically isolated from the outer grounding housing.

7. The wire termination device of claim 1, further comprising at least one additional retention member coupled to the housing and located at least partially within the opening of the housing, and wherein the retention member and the at least one additional retention member are arranged symmetrically about the longitudinal direction.

8. The wire termination device of claim 1, further comprising an outer seal coupled to the housing and extending from the first end of the housing.

9. A wire termination system comprising:
a feedthrough device comprising a pin;
a wire termination device comprising:
  a housing having a first end and a second end spaced apart from the first end in a longitudinal direction, the housing coupled to a wire at the first end of the housing, the housing defining a cavity and an opening to the cavity at the first end of the housing, and
  a retention member coupled to an inside surface of the housing such that the retention member extends from the inside surface into the cavity of the housing, the retention member engaged with the pin of the feedthrough device to retain the pin of the feedthrough device in the cavity of the housing.

10. The wire termination system of claim 9, wherein the retention member comprises an elongated strip of material having a first end and a second end, and wherein the first end of the elongated strip is coupled to the inside surface of the housing and the second end of the elongated strip is configured to engage the pin of the feedthrough device to retain the pin of the feedthrough device in the cavity of the housing.

11. The wire termination system of claim 9, wherein the housing has a first end surface at the first end, and the retention member is configured to bias the first end surface of the housing against the feedthrough device when the retention member is engaged with the pin of the feedthrough device.

12. The wire termination system of claim 11, wherein:
the feedthrough device comprises a sealing member having a sealing surface; and
the retention member is configured to bias the first end surface of the housing against the sealing surface of the sealing member of the feedthrough device to seal the opening such that the cavity is sealed from an ambient environment when the retention member is engaged with the pin of the feedthrough device.

13. The wire termination system of claim 9, wherein the feedthrough device comprises a sealing member that comprises an epoxy.

14. The wire termination system of claim 9, wherein the wire termination device comprises:
an outer grounding housing; and
an electrically insulating layer;
wherein the housing of the wire termination device is received within the outer grounding housing, and wherein the electrically insulating layer is disposed between the housing and the outer grounding housing such that the housing is electrically isolated from the outer grounding housing.

15. The wire termination system of claim 9, wherein the wire termination device further comprises an outer seal coupled to the housing and extending from the first end of the housing.

16. The wire termination system of claim 9, wherein the feedthrough device comprises a housing and an insulator arranged radially between the pin and the housing, and wherein a hermetic seal is formed between the insulator and the housing.

17. The wire termination system of claim 16, wherein an additional hermetic seal is formed between the insulator and the pin.

18. A method for connecting a wire with a feedthrough device, the method comprising:
coupling the wire to a wire termination device at a second end of a housing of the wire termination device, the housing having a first end spaced apart from the second end in a longitudinal direction and defining a cavity open at the first end of the housing; and
after coupling the wire to the wire termination device, inserting a pin of a feedthrough device into the cavity of the wire termination device until a retention member of the wire termination device engages the pin of the feedthrough device and retains the pin of the feedthrough device in the cavity of the housing,
wherein the retention member is coupled to an inside surface of the housing such that the retention member extends from the inside surface into the cavity of the housing.

19. The method of claim 18, wherein coupling the wire to the wire termination device comprises soldering the wire to the wire termination device.

20. The method of claim 18, wherein inserting the pin of the feedthrough device into the cavity of the wire termination device until the retention member of the wire termination device engages the pin of the feedthrough device comprises inserting the pin of the feedthrough device into the cavity of the wire termination device until at least one of the retention member or pin of the feedthrough device produces an audible sound.

\* \* \* \* \*